(12) United States Patent
Kobayashi

(10) Patent No.: US 6,542,147 B2
(45) Date of Patent: Apr. 1, 2003

(54) MENU SELECTION INPUT DEVICE

(75) Inventor: Koji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 84 days.

(21) Appl. No.: 09/724,997

(22) Filed: Nov. 29, 2000

(65) Prior Publication Data

US 2001/0050668 A1 Dec. 13, 2001

(30) Foreign Application Priority Data

Nov. 30, 1999 (JP) ............................................ 11-341124

(51) Int. Cl.⁷ ................................................. G09G 5/00
(52) U.S. Cl. ....................................... 345/156; 345/310
(58) Field of Search ................................. 345/764, 785, 345/810, 819, 830, 156–168

(56) References Cited

U.S. PATENT DOCUMENTS 4,899,136 A * 2/1990 Beard et al. ................ 345/156
5,999,169 A * 12/1999 Lee ............................. 345/163

FOREIGN PATENT DOCUMENTS

| JP | A 8-83141 | 3/1996 |
| JP | 08-083141 | * 3/1996 |
| JP | A 10-333806 | 12/1998 |

* cited by examiner

Primary Examiner—Amare Mengistu
Assistant Examiner—Leonid Shapiro
(74) Attorney, Agent, or Firm—Young & Thompson

(57) ABSTRACT

In a menu selection input device including a selecting portion for selecting a selected item and a display portion for displaying the selected item, the selecting portion includes at least one changing switch for changing the selected item. The menu selection input device has a switch transition state in which the changing switch is turned from an initial on state through an off state to a later on state and which corresponds to an item changing state of changing the selected item. Continuity of the later on state of the changing switch creates a repetitive changing state in which the selected item is successively changed one after another. Successive change occurs when the changing switch is turned from the initial on state to the off state and thereafter to the later on state within a predetermined time interval.

5 Claims, 2 Drawing Sheets

MENU SELECTION INPUT DEVICE

BACKGROUND OF THE INVENTION

This invention relates to a menu selection input device and, in particular, to a menu selection input device for efficiently selecting a desired item among a list of a number of items to input or enter the desired item.

A computer system or a system having set-up items performs an initial operation in response to an external operation, i.e., an operation by a user, given from the outside of the system. A series of user's operations define the execution of a function of the computer system or the initial operation of the system such as the set-up of operating conditions. The computer includes a display screen for displaying one of a plurality of selectable items or a list of a part of or all of a plurality of selectable items, and a menu selection tool (input means) for selecting a desired one of the selectable items as a selected item by the use of the display screen. The selected item which is currently selected by the computer system is displayed on the display screen. The user may change the selected item by the use of the menu selection tool.

As the above-mentioned menu selection tool, use may be made of a switch for carrying out an input operation by switching an on-state and an off-state, as in a push button. Although only the two values, namely, the on-state and the off-state, are given by the switch to the computer, the switch is easy for the user to perform the input operation and low in cost. Therefore, the switch is generally used as a component of a major input device such as a keyboard. An input system having the switch of the type described is widely used for execution of computer software such as a text editor, a spreadsheet program, and a database-client program, setting of a timer in a video tape recorder, or for selection of a called party in a mobile telephone.

In the above-mentioned system, the selected item is displayed on the display screen in the following manner. In one example, the selectable items are located on a two-dimensional coordinate on the display screen and one of the selectable items as the selected item is specified by a position of a cursor. The position of the cursor is changed and moved by cursor keys. In another example, only the selected item is displayed without displaying the remaining or non-selected items so as to specify the selected item. The selected item is displayed on the display screen as a displayed item. The displayed item representative of the selected item can be changed by the use of the switch so that the selected item is set or reset.

The operation of turning on and off the switch is carried out in the following manner. At first, a changing switch for changing the selected item is turned on. By this changing operation, the selected item is changed only once. Then, if the changing switch which has been turned on for changing the selected item as mentioned above is not turned off for a predetermined time period, the selected item is successively changed one after another at a preselected time interval as a changing time interval. The above-mentioned changing state is called a repetitive changing state. The predetermined time period after the changing switch is turned on and before the transition into the repetitive changing state is called a waiting time period. The repetitive changing state comes to an end under various conditions depending on the individual computer systems. In any event, the repetitive changing state comes to an end by turning off the changing switch which has been turned on.

In the computer system such as a video tape recorder, the user can not easily modify or change the set-up for the waiting time period before the transition into the repetitive changing state and the changing time interval at which the selected item is changed in the repetitive changing state. In the personal computer, the waiting time period and the changing time interval must preliminarily be selected as an initial set-up for an input method and, if any modification is desired, the initial set-up must be carried out again.

In most cases, The above-mentioned input system is formed as a separate computer system or as a sub-system for a computer system. The input system or the computer system as described above is available as a computer-readable recording medium.

The waiting time period before the transition into the repetitive changing state is selected to be longer than the changing time interval in the repetitive changing state. This prevents the occurrence of troubles when the selected item is changed during the repetitive changing state. On the contrary, in case where the waiting time period is shorter than the changing time interval, the on/off operation of the switch intended to change the selected item only once will create the repetitive changing state in which the changing operation is repeated a plurality of times. It is thus difficult to select a desired item.

In case where the selection must be made among a list of a large number of items, the operation will not be efficiently performed because, in the existing technique, the user can not temporarily increase the changing speed during the repetitive changing state. In order to increase the changing speed, the user himself should quickly repeat the on/off operation of the changing switch. Even in case where the set-up for the repetitive changing state can be modified, modification requires a long time so that the efficiency can not be improved. If the changing speed of changing the selected item during the repetitive changing state is selected to be sufficiently high in the initial set-up, then it is difficult to stop the repetitive changing state accurately at a right timing, i.e., at a desired item.

SUMMARY OF THE INVENTION

It is an object of the present invention to provide a menu selection input device which is capable of efficiently selecting a desired item from a list of a plurality of items.

Menu selection input devices according to the present invention are as follows:

(1) A menu selection input device comprising, a selecting portion for selecting a desired item as a selected item; and a display portion for displaying the selected item;

the selecting portion comprising at least one changing switch for changing the selected item;

the changing switch having either one of an on state and an off state at a time;

the menu selection input device having a switch transition state in which the changing switch is turned from an initial on state through the off state to a later on state and which corresponds to an item changing state of changing the selected item.

(A user may temporarily modify a set-up for changing the selected item simply by operating the changing switch without modifying an initial set-up. The menu selection input device may comprise a single changing switch or a plurality of changing switches. In case where a plurality of changing switches are provided, the menu selection input device has another switch transition state in which one of the changing switches is turned from the on state into the off state and thereafter another changing switch is turned into the on state. Moreover, two or more changing switches may be in the on state.)

(2) A menu selection input device as described in the paragraph (1), wherein: continuity of the later on state of the changing switch creates a repetitive changing state in which the selected item is successively changed one after another.

(3) A menu selection input device as described in the paragraph (2), wherein:

the switch transition state is a state in which the changing switch is turned from the initial on state into the off state and which the changing switch is thereafter turned from the off state into the later on state within a predetermined time interval;

the item changing state being a state in which the repetitive changing state is started immediately after the changing switch is turned into the later on state.

(Thus, no waiting time period is required before the transition into the repetitive changing state so that the user can quickly select and input the selected item.)

(4) A menu selection input device as described in the paragraph (2), wherein:

the switch transition state is a state in which the changing switch is turned from the initial on state into the off state and which the changing switch is thereafter turned from the off state into the later on state within a predetermined time interval;

the item changing state being a state in which a changing speed during the repetitive changing state is modified to become equal to t times an initial set-up speed initially set into the menu selection input device;

t being a positive real number except 1.

(The user can modify the changing speed during the repetitive changing state so as to quickly or easily select as the selected item a desired item from a list of a large number of items and input the selected item.)

(5) A menu selection input device as described in the paragraph (4), wherein:

t is equal to 2.

(In order for the user to quickly select the desired item from a list of a large number of items, t is preferably equal to 2.)

(6) A menu selection input device as described in the paragraph (2), wherein:

the switch transition state is a state in which a different switch is not turned into an on state while said changing switch is kept in the off state;

the item changing state being a state in which a changing speed during the repetitive changing state is modified to become equal to t times an initial set-up speed initially set into the menu selection input device;

t being a positive real number except 1.

(The user can modify the changing speed during the repetitive changing state so as to quickly or easily select as the selected item a desired item from a list of a large number of items and input the selected item.)

(7) A menu selection input device as described in the paragraph (6), wherein:

t is equal to 2.

(In order for the user to quickly select the desired item from a list of a large number of items, t is preferably equal to 2.)

(8) A menu selection input device as described in the paragraph (2), wherein:

the switch transition state is a state in which a different switch is not turned into an on state while the changing switch is kept in the off state;

the item changing state being a state in which the repetitive changing state is started immediately after the changing switch is turned into the later on state.

(Thus, no waiting time period is required before the transition into the repetitive changing state so that the user can quickly select and input the selected item.)

The switch transition state may be a state in which the changing switch is kept in the off state for a time interval longer than the predetermined time interval. The item changing state corresponding to the above-mentioned switch transition state is an initial set-up state. In case where the changing speed during the repetitive changing state is excessively high, the item changing state of changing the selected item can be turned back into the initial setup state by keeping the changing switch in the off state over the predetermined time interval.

In case where a plurality of changing switches are provided, more complicated switch transition states are present. For example, in one switch transition state, one of the changing switches as a particular changing switch is turned from the on state into the off state and thereafter the particular changing switch is turned into the on state. In another switch transition state, one of the changing switches is turned from the on state into the off state and thereafter another changing switch is turned into the on state. In still another switch transition state, two changing switches simultaneously kept in the on state and thereafter one of these switches is turned into the off state. The item changing states individually corresponding to the above-mentioned three switch transition states may be different from one another. Alternatively, two or all of the above-mentioned three switch transition states may correspond to a single item changing state in common.

DESCRIPTION OF PREFERRED EMBODIMENTS

Figure 1:
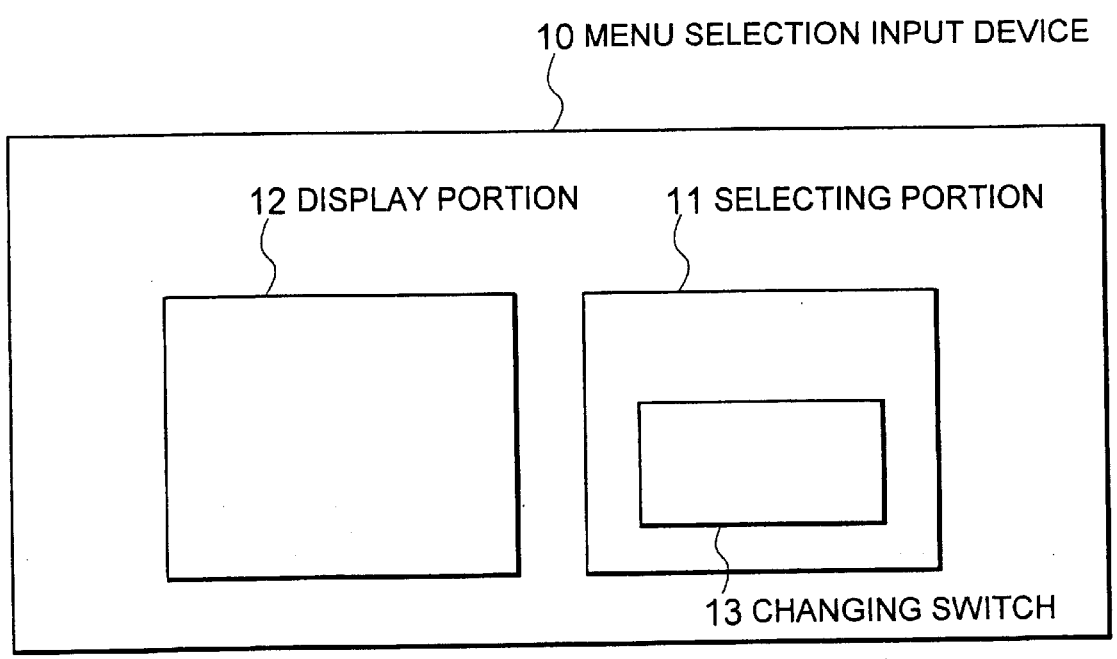
FIG. 1 is a block diagram showing a structure of a menu selection input device according to an embodiment of the present invention.

Now, description will be made of this invention with reference to the drawing.

Referring to FIG. 1, a menu selection input device 10 according to this invention comprises a selecting portion 11 for selecting a desired item as a selected item and a display portion 12 for displaying the selected item. The selecting portion 11 has a changing switch 13 for changing the selected item. The changing switch 13 has either one of an on state and an off state at a time. The menu selection input device 10 has a switch transition state in which the changing switch 13 is turned from an initial on state through the off state to a later on state and which corresponds to an item changing state of changing the selected item.

Continuity of the later on state of the changing switch 13 creates a repetitive changing state in which the selected item is successively changed one after another.

The switch transition state may be a state in which the changing switch 13 is turned from the initial on state into the off state and which the changing switch 13 is thereafter turned from the off state into the later on state within a predetermined time interval. In this case, the item changing state is a state in which the repetitive changing state is started immediately after the changing switch 13 is turned into the later on state. Alternatively, the item changing state is a state in which a changing speed during the repetitive changing state is modified to become equal to t times an initial set-up speed initially set into the menu selection input device, where t is a positive real number except 1. Preferably, t is 2.

The switch transition state may be a state in which a different switch is not turned into an on state while the changing switch 13 is kept in the off state. In this case, the item changing state is a state in which a changing speed during the repetitive changing state is modified to become equal to t times the initial set-up speed. Alternatively, the item changing state is a state in which the repetitive changing state is started immediately after the changing switch 13 is turned into the later on state.

The selected item may be a cell of a grid-like region displayed on a display screen of the display portion 12. Alternatively, the selected item is a current position of a cursor moving on the display screen of the display portion 12. The selected item can scroll on the display screen of the display portion by operating the changing switch 13.

Figure 2:
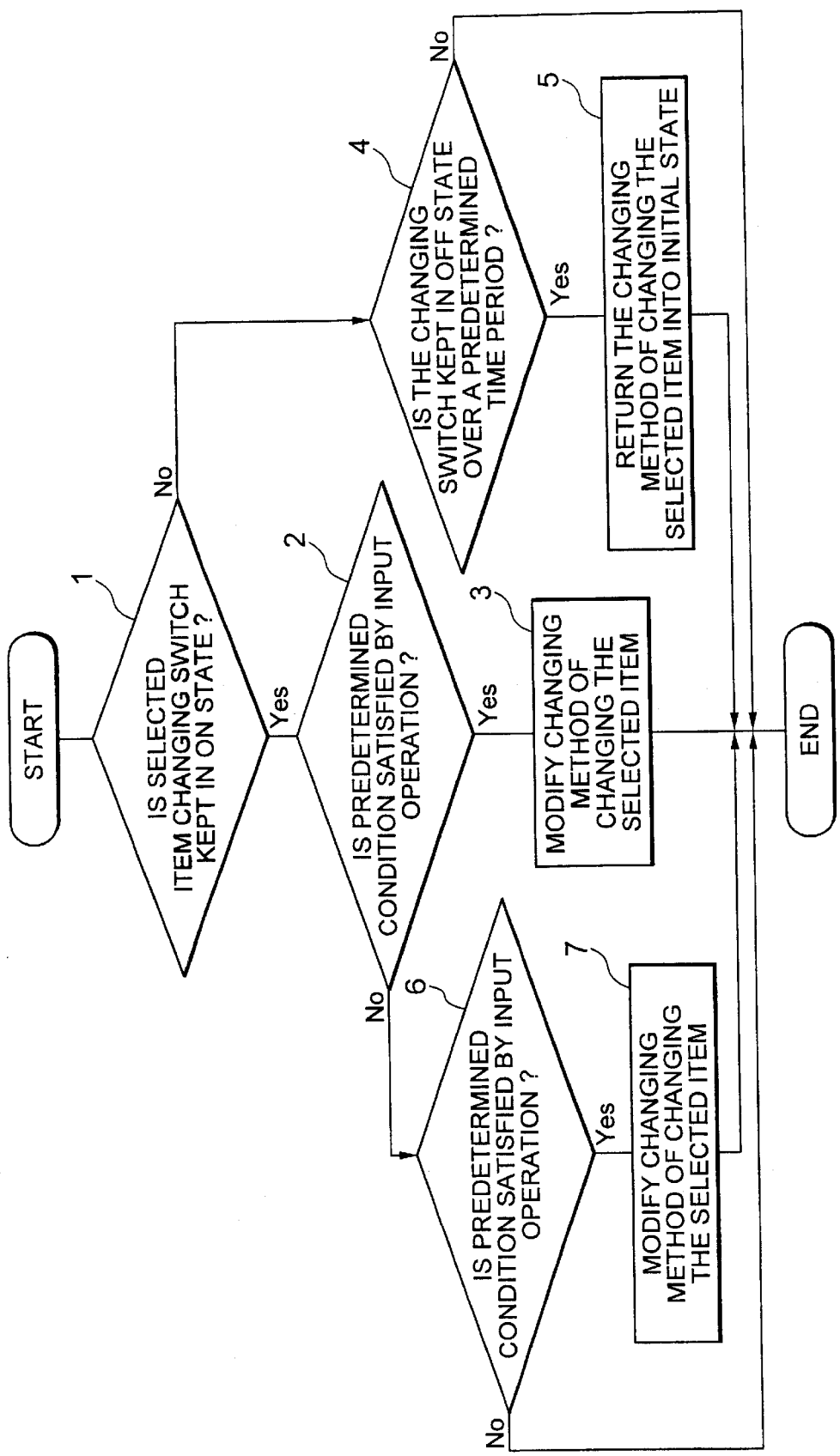
FIG. 2 is a flow chart showing an operation of the menu selection input device illustrated in FIG. 1.

Referring to FIG. 2, description will be made about an operation of the menu selection input device illustrated in FIG. 1. In the illustrated example, the operation comprises seven steps.

Step S1

The menu selection input device has an input portion for an input operation by a user. The input portion is provided with the changing switch 13. As an example of the input portion, a keyboard may be used. The changing switch 13 may comprise any special key on the keyboard. The input portion may have a single changing switch or a plurality of changing switches. In a step S1, judgment is made about whether or not the changing switch 13 is turned from an off state into an on state. If it is judged that the changing switch 13 is turned into the on state (yes in step S1), the step S1 proceeds to a step S2. If not (no in step S1), the step S1 proceeds to a step S4.

Step S2

When the changing switch 13 is turned into the on state, judgment is made about the content of the input operation by the changing switch 13. The content of the input operation is given by a first predetermined condition. The first predetermined condition includes the operations of pushing (turning on) the changing switch 13, releasing (turning off) the changing switch 13, and again pushing (turning on) the changing switch 13 within a predetermined time period after releasing the changing switch 13. In the step S2, judgment is made about whether or not the input operation satisfies the first predetermined condition. If the first predetermined condition is satisfied (yes in step S2), the step S2 proceeds to a step S3. If not (no in step S2), the step S2 proceeds to a step S6.

Step S3

In Step S3, a changing method of changing the selected item during a repetitive changing state is modified. Specifically, a waiting time period (corresponding to the above-mentioned predetermined time period) after the changing switch is turned on and before the transition into the repetitive changing state is omitted thereafter. The above-mentioned modification is executed immediately after completion of a series of on/off/on operations.

Step S4

In the step S4, judgment is made about whether or not the off state is maintained over the predetermined time period after the changing switch is turned from the on state into the off state. If the off state is maintained over the predetermined time period (yes in step S4), the step S4 proceeds to a step S5.

Step S5

In the step S5, the changing method of changing the selected item during the repetitive changing state is modified. The changing method which has been modified in the step 3 or 7 is returned to an initial changing method preliminarily given. The initial changing method of changing the selected item during the repetitive changing state is preliminarily set by a manufacturer of the input device or by the user himself.

Step S6

In the step S6, judgment is made about whether or not a second predetermined condition is satisfied. The second predetermined condition includes the operations of turning the changing switch 13 from the on state into the off state and again turning the changing switch 13 into the on state without turning any other switch into the on state. If the second predetermined condition is satisfied (yes in step S6), the step S6 proceeds to a step S7.

Step S7

In the step S7, the changing method of changing the selected item during the repetitive changing state is modified. Specifically, a changing speed of changing the selected item during the repetitive changing state is modified to a level twice as fast as a current changing speed.

It is possible to carry out the operation in the manner similar to the existing technique. According to a prescribed changing method preliminarily set in the input device, the repetitive changing state is started after the changing switch 13 is kept in the on state for a waiting time period. The changing method during the repetitive changing state is modified by the on/off/on operations of turning the changing switch 13 from the on state into the off state and thereafter again turning the changing switch 13 into the on state according to the present invention. If the off state is interrupted within the predetermined time period, the waiting time period before the transition into the repetitive changing state is omitted so as to immediately start the repetitive changing state.

Moreover, by the on/off/on operations of turning the changing switch 13 from the on state into the off state and thereafter again turning the changing switch 13 into the on state without turning any other changing switch into the on state, the changing speed during the repetitive changing state can be increased to a level twice as fast as the current changing speed.

As a result of the on/off/on operations added according to the present invention, the changing speed of the repetitive changing state is increased to twice. It is noted here that the changing speed during the repetitive changing state will not be modified if any other switch is turned on before the changing switch which has been turned on and then turned off is again turned on. At first, the changing switch is turned on to change the selected item. Thereafter, every time when the changing switch is turned off and then turned on, i.e., performs a series of off/on operations, the changing speed during the repetitive changing state is increased to twice. Specifically, the changing speed given by a series of off/on/off/on operations is twice as high as that given by a series of off/on operations. Likewise, the changing speed given by a series of off/on/off/on/off/on operations is twice as high as that given by a series of off/on/off/on operations. Thus, by repeating the off/on operations an appropriate number of times, the user can adjust the changing speed of changing the selected item. Therefore, the input operation is efficiently carried out.

In case where the changing switch is kept in the off state over the predetermined time period, the item changing state of changing the selected item is modified into an initial state preliminarily selected. For example, when the changing speed during the repetitive changing state becomes excessively high, the changing method of changing the selected item can be returned back to the initial state by keeping the changing switch in the off state over the predetermined time period.

In case where the computer system with the menu selection input device according to the present invention is a digital clock, the item, the selected item, and the changing switch correspond to a time instant, a current time instant being displayed, and a time adjusting switch for adjusting the current time instant, respectively.

In case where the computer system with the menu selection input device according to the present invention is a text editor, the item, the selected item, and the changing switch correspond to a position on a display screen, a current position of a cursor, and each cursor key, respectively.

Now, description will be made of a menu selection input device according to another embodiment of the present invention. In this embodiment, the changing switch is a cursor key. The menu selection input device comprises a plurality of cursor keys.

By the operations of turning one of the cursor keys as a particular cursor key from the on state into the off state and thereafter again turning the particular cursor key into the on state, the changing method for the repetitive changing state is modified. When the cursor key is kept in the off state within the predetermined time period, the waiting time period before the transition into the repetitive changing state is omitted. If any other key is not pushed during the above-mentioned off state, the changing speed during the repetitive changing state is increased to twice. Either the particular cursor key which has been turned on in a first turning-on operation or a different cursor key which has not yet been turned on may be turned off in a second turning-on operation. It is assumed here that a cursor is successively moved in one direction in the repetitive changing state. In order to finish the repetitive changing state, the particular cursor key is turned off. In order to modify the moving direction of the cursor, another cursor key is turned on within the predetermined time period. In this event, the repetitive changing state is started without any waiting time period.

The changing speed during the repetitive changing state is increased to twice only in case where the condition in the step S2 is not satisfied (see FIG. 2). The operations in the steps S6 and S7 may be carried out if the condition in the step S2 is satisfied or irrespective of the result in the step S2. Thus, the functions and the conditions in the menu selection input device of the present invention might overlap. In this event, a priority is preliminarily determined.

An alternative input method for the menu selection input device according to the present invention will be described. Specifically, after the changing switch is turned from the on state into the off state, any other changing switch is turned into the on state. In the foregoing embodiment, a first-pushed changing switch which has been turned on in the first turning-on operation may be identical with or different from a second-pushed changing switch which is turned on in the second turning-on operation. If the first-pushed changing switch is different from the second-pushed changing switch, the waiting time period returns back to an initial waiting time period which is preliminarily given.

According to the menu selection input device of the present invention, the user can modify the item changing state of changing the selected item by modifying the input method of the changing switch without modifying the initial set-up of the input method. The input method can be modified in various manners simply by changing the content of the input operation of the changing switch. Specifically, in case where a specific item is selected among a list of a large number of selectable items, the selection can be efficiently carried out by modifying the input method in response to the input operation by the user.

What is claimed is:

1. A menu selection input device comprising:

a selecting device for selecting an item, said selecting device having at least one changing switch for changing the item; and a display device for displaying the item;

said changing switch being movable between an on state and an off state, wherein movement of said changing switch from said on state to an off state to a later on state within a predetermined time initiates a changing state, so that said display device successively displays different items from said item at a first rate of change, and wherein an additional movement of said changing switch to a later off state and then to a yet later on state within another predetermined time changes said changing state, so that said display device displays different items from said item at a second rate of change that is twice said first rate of change.

2. The device according to claim 1, wherein a further additional movement of said changing switch to a yet later off state and then to a yet still later on state within yet another predetermined time changes said changing state, so that said display device successively displays different items from said item at a third rate of change that is twice said second rate of change.

3. The device according to claim 1, wherein keeping said changing switch in said later off state beyond said another predetermined time changes said changing state, so that said display device successively displays different items from said item at said first rate of change.

4. The device according to claim 2, wherein keeping said changing switch in said yet later off state beyond said yet another predetermined time changes said changing state, so that said display device successively displays different items from said item at said first rate of change.

5. A menu selection input device comprising:

a selecting device for selecting an item, said selecting device having at least one changing switch for changing the item; and a display device for displaying the item;

said changing switch being movable between an on state and an off state, wherein movement of said changing switch from said on state to an off state to a later on state within a predetermined time initiates a changing state, so that said display device successively displays different items from said item at a first rate of change, and wherein an additional movement of said changing switch to a later off state and then to a yet later on state within another predetermined time changes said changing state, so that said display device displays different items from said item at a second rate of change that is t times said first rate of change, where t is a positive integer greater than or equal to 2.

* * * * *